Dec. 23, 1924.
J. E. McMAHON
SHOVEL HANDLE
Filed Sept. 8, 1924
1,520,253
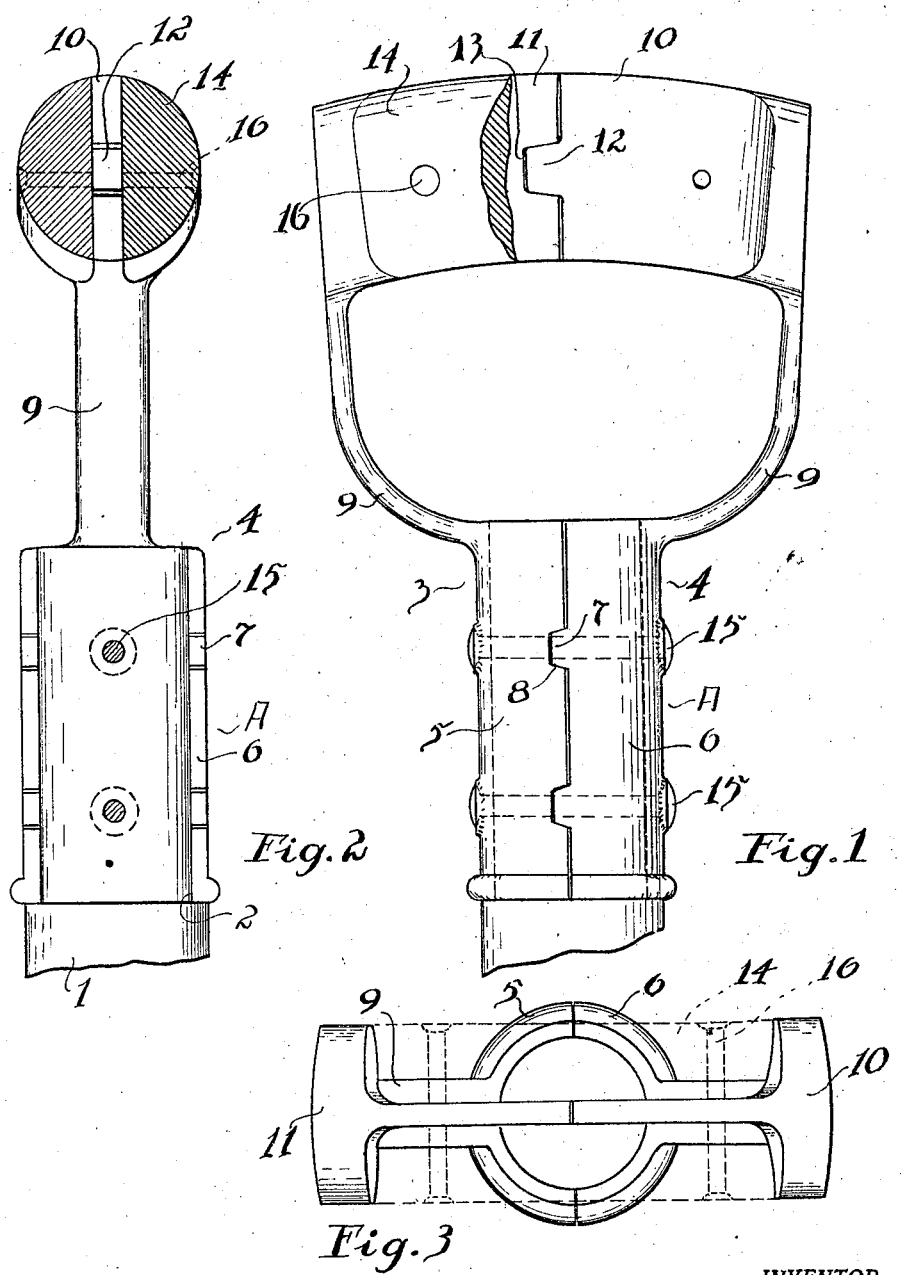
INVENTOR
John E. McMahon
BY
A. H. S. Johnson
ATTORNEY Patented Dec. 23, 1924.

1,520,253

UNITED STATES PATENT OFFICE.

JOHN E. McMAHON, OF ST. PAUL, MINNESOTA.

SHOVEL HANDLE.

Application filed September 8, 1924. Serial No. 736,515.

*To all whom it may concern:*

Be it known that I, JOHN E. MCMAHON, a citizen of the United States, residing at St. Paul, in the county of Ramsey and State of Minnesota, have invented certain new and useful Improvements in Shovel Handles, of which the following is a specification.

The present invention relates to shovel handles.

In a shovel handle of a well-known type, a piece of wood which forms the shaft of the handle is shaped and cut out at the top to form a D. The D portion of such a handle is not as strong as it is desirable to have it, and, in case a shovel handle of this type is broken, it is necessary to replace the entire handle since repair of the D or replacement of the shaft alone is impracticable.

An object of the present invention is to make a durable D for a shovel handle, the parts of which may be separately replaced, if broken.

Another object is to improve and strengthen a shovel handle.

Another object is to make a strong and simple D for a shovel handle which may be easily adjusted to take up shrinkage, in a shaft to which it is connected, or within the D itself.

In order to attain these objects there is provided in accordance with one embodiment of the invention, a pair of oppositely disposed, interlocking metallic members, the parts of which are complementary and into the sides of which are inserted wooden members which provide a means for manually grasping the handle.

These and other features of the invention will be more fully brought out in the following description and the accompanying drawings, wherein:

Figure 1, is a view in front elevation of a D made in accordance with the present invention, a portion of a wooden handle insert being broken away to show the structure of the D.

Figure 2, is a view in side elevation of one-half of the D affixed to a shovel handle, the wooden handle inserts being shown in cross section in position thereon; and Figure 3, is a view in top elevation of the D, the wooden handle inserts being indicated by dotted lines.

Referring to the drawings in detail, a shaft 1 of a well known type is affixed to a shovel, not shown, or other implement, in a well known manner. The upper portion of the shaft may be cut out as at 2 to form a seat for a D, generally indicated by A. The D is composed of two complementary members 3 and 4 which may be of forged, cast, or stamped metal, as desired. The portions 5 and 6 of the members 3 and 4 are semi-cylindrical in shape, member 6 being provided with lugs 7 which fit into recesses 8 in member 6. The sides 9 of the D are curved outwardly in a customary manner and the portion which forms the hand-grip is composed of two members 10 and 11 which interlock at the center by means of a lug 12 which fits into a recess 13 in the same manner as the lugs and recesses of the portions 5 and 6. The portions 10 and 11 are cut out on their ends, as shown, and into the cut out portion on each side is inserted a wooden or fibrous hand grip member 14. Members 14 are preferably of a substance which is a poor conductor of heat, so that when used in cold weather the handle will not cause discomfort to the user thereof.

The complementary, semi-cylindrical portions 5 and 6 are secured together by rivets 15 which pass through the handle and are riveted on the outside of the members 5 and 6. A slight clearance may be allowed between the adjoining edges of the cylindrical members 5 and 6 and the portions 10 and 11. Then, should the shaft 1 of the handle shrink, or if, for other reasons, the D should become loosened upon the shaft 1, the D may be tightened upon the shaft by hammering the rivets 15 to draw the complementary semi-cylindrical portions 5 and 6 into closer contact with each other. Should the hand grip members 14 become damaged, it would be possible to replace these members by cutting the rivets 16 to release the broken portions from the handle and new grip members 14 may be inserted in place by means of rivets.

Tightening the various parts of the D may be accomplished by a laborer who is using a shovel equipped with the present invention by said laborer simply pounding down the rivets 15 to draw members 5 and 6 into closer engagement with each other, and, since the tools on a job where shovels are largely employed are usually of the simplest, the fact that a D may be repaired or replaced with no other tools than a cold chisel for cutting old rivets and a hammer for setting new rivets, is a desirable feature in the present invention.

What I claim is:

1. A shovel handle, comprising a shaft, a pair of complementary, interlocking members to embrace said shaft, an upwardly curved extension connected to each of said interlocking members, a transverse projection from each of said upwardly curved extensions, interlocking means intermediate said transverse projections, and fibrous means affixed to a side of said extensions to form a manual grip thereon.

2. A shovel handle, comprising a shaft, interlocking, semi-cylindrical portions embracing the top of said shaft, means penetrating each of said semi-cylindrical members and the shaft to draw the members into interlocking engagement with each other, a curved arm extending outwardly and upwardly from the top of each semi-cylindrical member, a transverse portion at the top of each curved arm, interlocking means intermediate the ends of said transverse portions, and fibrous grip means affixed to the centrally projecting extensions to afford a manual grip thereon.

3. A shovel handle comprising a shaft, a cut-out portion at the upper end of said shaft, a pair of interlocking members embracing said shaft, means extending through said interlocking members and through the shaft to hold the interlocking members in intimate engagement with each other, a curved arm extending upwardly from each interlocking member, a centrally extending projection from the upper portion of each curved arm, said projection having a cut-out portion on each side thereof, one of said extensions having a lug thereon and the other of said extensions having a recess therein to interlockingly receive said lug, a grip member seated in the cut-out portions of the extensions and being integrally connected to each of said extensions to unite said extensions and form a grip surface thereon.

4. A shovel handle, comprising a shaft, a pair of oppositely disposed interlocking members affixed thereto, each of said interlocking members having a semi-cylindrical portion to receive the shaft, interlocking means intermediate the semi-cylindrical portions of each member, an upwardly curved portion connected to each semi-cylindrical portion, each of said upwardly curved portions having a transverse member integral therewith to extend toward and engage with the other transverse member to form a grip.

In testimany whereof I affix my signature.

JOHN E. McMAHON.